United States Patent [19]

Kanao

[11] Patent Number: 5,046,531
[45] Date of Patent: Sep. 10, 1991

[54] SYNTHETIC RESIN PIPE FOR UNDERGROUND USE

[76] Inventor: Shiro Kanao, No. 9-18, Nanpeidai 4-chome, Takatsuki-shi, Osaka, Japan

[21] Appl. No.: 926,841

[22] Filed: Nov. 3, 1986

Related U.S. Application Data

[63] Continuation of Ser. No. 691,809, Jan. 16, 1985, abandoned.

[30] Foreign Application Priority Data

Oct. 22, 1984 [JP] Japan ............... 59-159601[U]

[51] Int. Cl.$^5$ ................... F16L 11/00; F16L 9/14
[52] U.S. Cl. .................... 138/122; 138/150; 138/153; 174/68 C
[58] Field of Search ............ 138/122, 125, 129, 150, 138/153, 132, 133, 105, 121, 154, 173, 172, 174; 174/68 C

[56] References Cited

U.S. PATENT DOCUMENTS

| 2,330,651 | 9/1943 | Welger | 138/133 |
| 3,047,026 | 7/1962 | Kahn | 138/124 X |
| 3,186,438 | 6/1965 | Holmgren | 138/125 X |
| 4,067,362 | 1/1978 | Jackman | 138/153 X |
| 4,140,154 | 2/1979 | Kanao | 138/132 |
| 4,304,266 | 12/1981 | Kutnyak et al. | 138/129 |
| 4,350,547 | 9/1982 | Kanao | 138/122 X |

FOREIGN PATENT DOCUMENTS

| 2141281 | 3/1973 | Fed. Rep. of Germany | 138/133 |
| 991542 | 5/1965 | United Kingdom | 138/132 |

Primary Examiner—Harvey C. Hornsby
Assistant Examiner—Stephen F. Gerrity
Attorney, Agent, or Firm—Sughrue, Mion, Zinn, Macpeak & Seas

[57] ABSTRACT

A synthetic resin pipe intended for underground use is disclosed having both an improved strength and flexibility but reduced weight. An inner layer of the body of the pipe is formed of a synthetic resin, and a reinforcing layer is wound around the inner layer. The reinforcing layer is porous, and may be composed of a helically wound punched metal belt, mesh, or the like. An outer layer composed of a helically wound belt of synthetic resin having a high fusibility with the material of the inner layer is formed over the reinforcing layer. A reinforcing rib, forming the corrugations of the pipe, is wound around the outer layer. If desired, the reinforcing rib can be made integral with the belt of the outer layer.

19 Claims, 4 Drawing Sheets

SYNTHETIC RESIN PIPE FOR UNDERGROUND USE

This is a continuation of application Ser. No. . . . 691,809.., filed Jan. 16, 1985 (now abandoned).

BACKGROUND OF THE INVENTION

The present invention relates to a pipe made of synthetic resin and which is intended for underground use. Particularly, the invention relates to such a pipe having a high pressure resistance and which may be used for an underground water main, a sewer or drain pipe, a pipe for protecting electrical cables, or the like.

A conventional underground pipe of the same general type to which the invention pertains has been manufactured by a process illustrated in FIGS. 1 and 2 of the accompanying drawing. With reference first to FIG. 1, a reinforcing rib 04, used to form corrugations on the exterior surface of the pipe, is manufactured from corrugated tube 03 having corrugations extending perpendicular to the corrugations of the completed pipe a which is covered with an extruded coating 02. To form the pipe, the rib 04 is wound around the main body 01 of the pipe in a molten state, pressing the rib 04 into the material of the pipe body 01.

A pipe so constituted is advantageous in that it has a good overall strength and a sufficient resistance to the pressure of the soil in which the pipe is buried. Also, the pipe is light in weight and can be readily handled. On the other hand, the pipe is disadvantageous in that it is difficult to control how far the rib 03 sinks into the material of the pipe body 01 when the rib 04 is being wound around and fused into the material of the pipe body 01. Accordingly, often the rib 04 sinks too far into the pipe body 01, making the pipe weak in such areas.

To overcome this problem, the present inventor has proposed (in Japanese Utility Model Application No. 122,687/1984) a pipe construction in which the rib is manufactured of the same materials as the material of the body 01 and is formed with a semicircular cross section with the flat bottom of the rib fitted in an outwardly projecting portion formed on the outer wall of the pipe body. Although a pipe of this structure has been found to have a sufficient pressure withstanding strength, it is necessary to make the wall of the pipe body thicker than is otherwise desired, thereby making the pipe heavy as a whole, thus making the pipe difficult to handle. Particularly, the pipe lacks flexibility, a desirable property in pipes of this general type. Moreover, the pipe is costly in that a large amount of resin material is needed in its manufacture.

SUMMARY OF THE INVENTION

Accordingly, it is an object of the present invention to provide a pipe intended for underground use and which is made of a synthetic resin in which the amount of resin material is reduced and the overall weight of the pipe is reduced (compared with the pipe of the above-mentioned Japanese Utility Model Application), and which has a remarkably superior flexibility.

In accordance with the above and other objects of the invention, the invention provides a pipe composed of a pipe body with a belt-like reinforcing rib coated with a material having similar properties to the synthetic resin material forming the pipe body or at least a high fusibility with the material of the pipe body, helically wound at a predetermined pitch on the outer circumferencial wall of the pipe body and fused thereto. The pipe body, in accordance with an important aspect of the present invention, has a multi-layer structure composed of two synthetic resin layers sandwiching therebetween a metal or fabric reinforcing layer.

DESCRIPTION OF THE PREFERRED EMBODIMENTS

Figure 1:
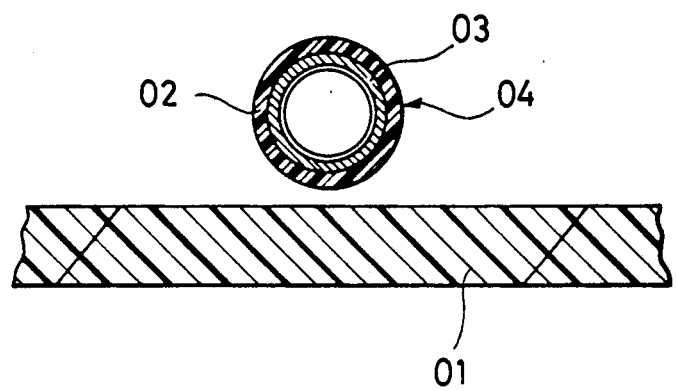
FIGS. 1 and 2 are cross-sectional views used to illustrate a method of manufacturing a conventional pipe.
Figure 2:
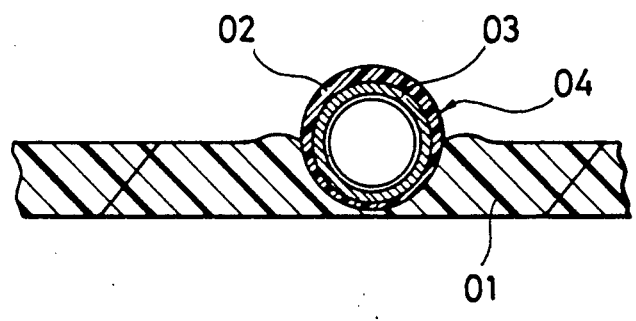
Figure 3:
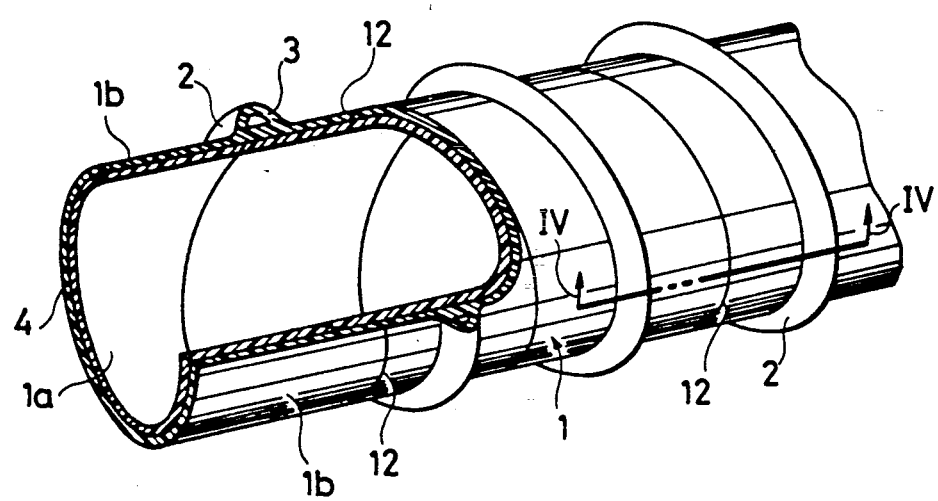
FIG. 3 is a perspective view, partially cut away, showing a first embodiment of a pipe in accordance with the invention.

Referring to the drawings, preferred embodiments of a synthetic resin pipe constructed in accordance with the invention will be described.

FIRST EMBODIMENT

Figure 4:
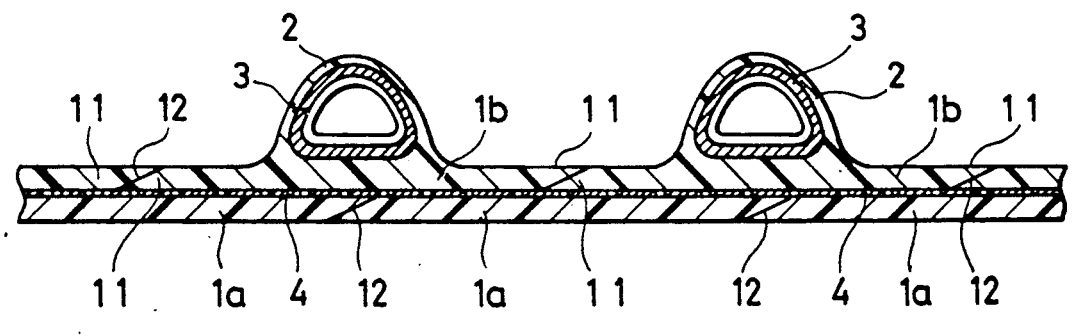
FIG. 4 is a cross-sectional view taken along a line IV—IV in FIG. 3.
Figure 5:
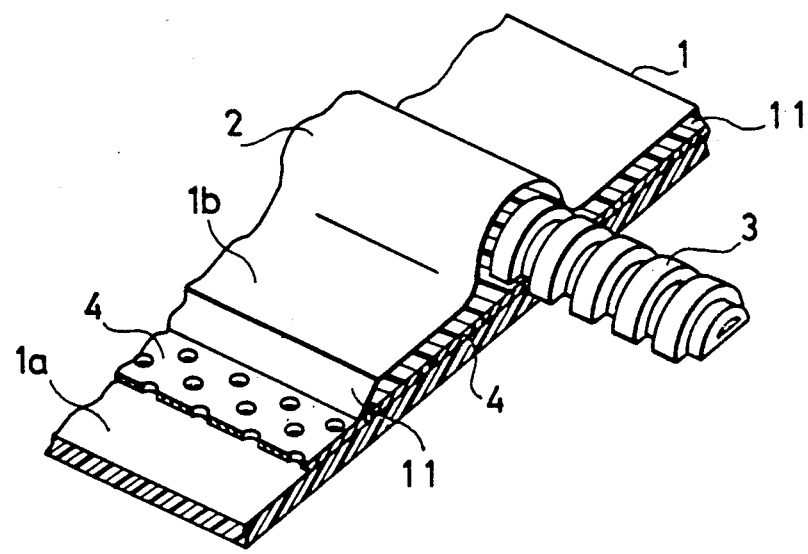
FIG. 5 is a perspective view, partially cut away, showing a part of the structure of FIG. 4 in more detail.
Figure 6:
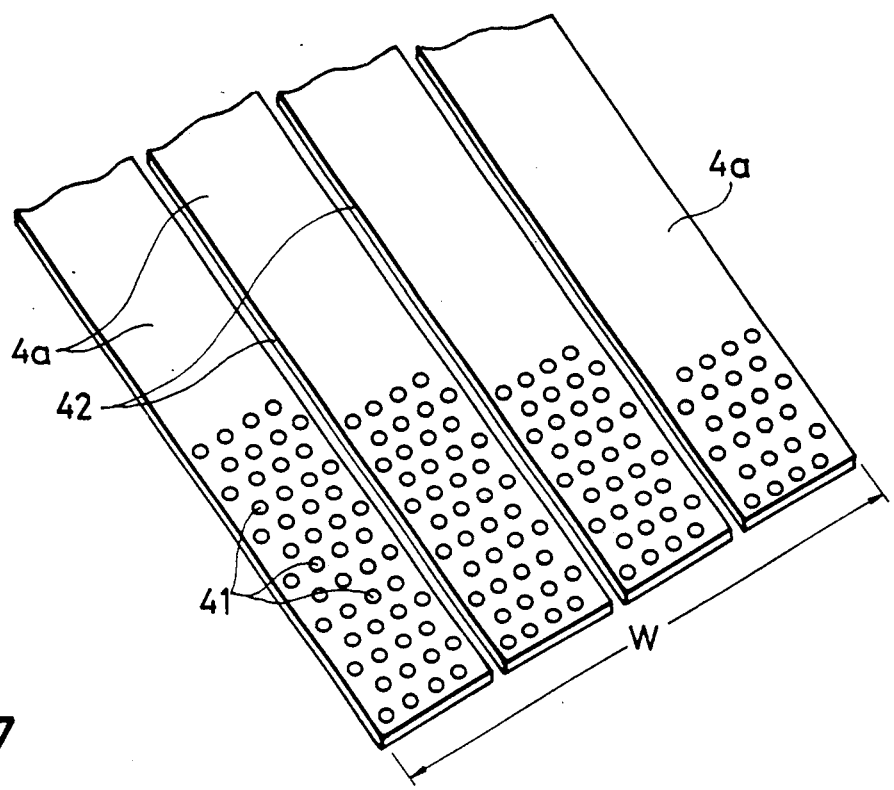
FIG. 6 is a perspective view of a reinforcing material used in the pipe body.

A first preferred embodiment of a pipe constructed in accordance with the invention will now be described. Referring simultaneously to FIGS. 3 through 6, a pipe body 1 has a multi-layer structure constituted by an inner layer 1a and an outer layer 1b sandwiching therebetween a reinforcing layer 4. To manufacture this pipe, the inner layer 1a is wrapped with a belt 4a (see FIG. 6) composed of a metal or fabric having a plurality of holes 41 therein. Small gaps 42 are left between adjacent windings of the belt 4a of the reinforcing layer 4. The outer layer 1b, with specific reference to FIG. 4, is first manufactured as a belt-like material having a corrugated reinforcing rib 3 embedded in a belt 1b of preferably the same material as the inner layer 1a. After the belt 4a has been wound around the inner layer 1a to form the reinforcing layer 4, the belt 1b is wound around the reinforcing layer 4 to obtain the construction illustrated in FIG. 4. Preferably, the edges 11 of the belt 1b' are beveled so that adjacent windings of the belt 1b overlap as illustrated in FIG. 4. Preferably, four windings of the belt 4a of the reinforcing layer 4 have a total width approximately equal to the width W of the belt 1b used to form the outer layer 1b. Upon winding the belt 1b around the reinforcing layer 4, the inner and outer layers are bonded together by flowing of molten resin material through the holes 41 in the reinforcing layer 4. Due to the presence of the reinforcing layer 4, the position of the reinforcing rib 3 relative to the remainder of the pipe wall is fixedly determined.

Although it is preferred that a belt 4a having a relatively narrow width be used to form the reinforcing layer 4 in view of the overall flexibility of the pipe body, a single punched metal belt of width W may be used if desired. It is further preferable that the locations of the junctions 12 between the windings of the inner layer 1a and the outer layer 1b be made different from one another.

SECOND EMBODIMENT

Figure 7:
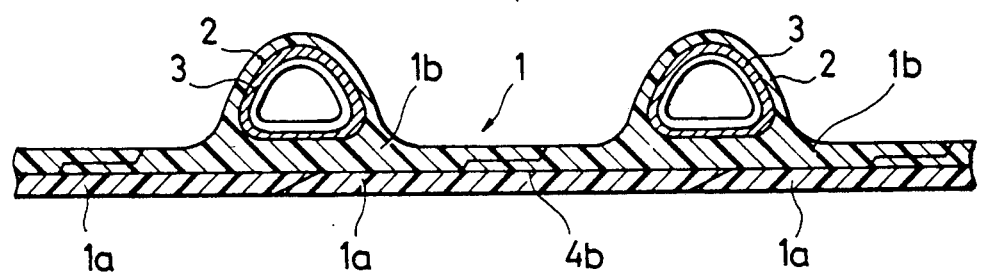
FIG. 7 is a cross-sectional view of a pipe constructed in accordance with a second embodiment of the invention.
Figure 8:
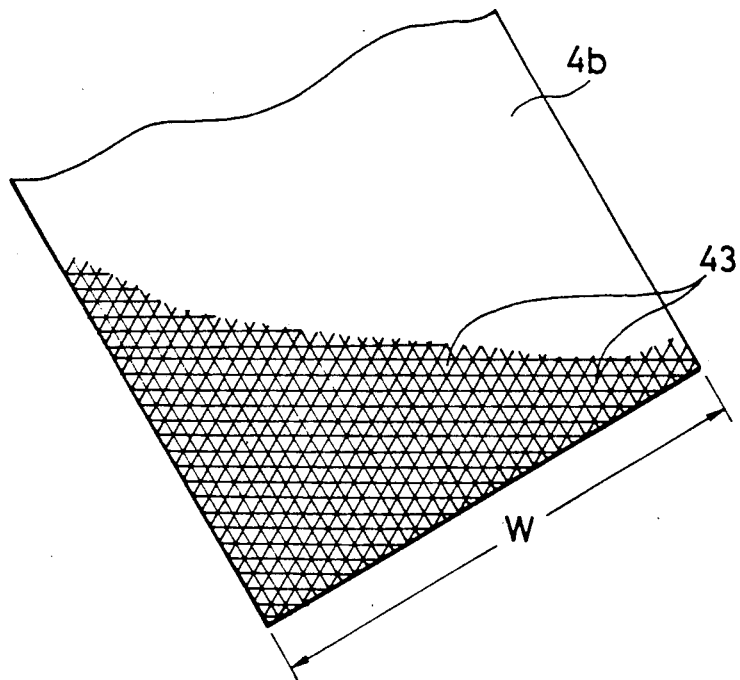
FIG. 8 is a plan view of a reinforcing material used in the embodiment of FIG. 5.

The second embodiment, shown in FIGS. 7 and 8, is substantially similar to the first embodiment, the exception being that the belt 4a of the reinforcing layer 4a is here replaced by a metal mesh 43 of width W. The effects are substantially similar to those of the first embodiment.

THIRD EMBODIMENT

Figure 9:
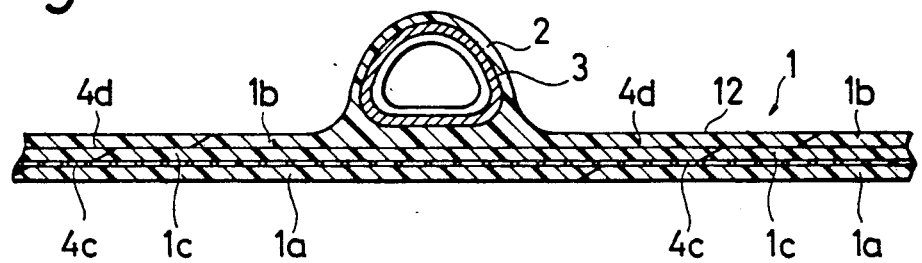
FIG. 9 is a cross-sectional view of a main part of a pipe constructed in accordance with a third embodiment of the invention.

In the third embodiment, illustrated in FIG. 9, a three-layer structure is employed. The inner layer 1a and the outer layer 1b are similar to those of the first embodiment. Interposed between the inner layer 1a and outer layer 1b is a middle resin layer 1c. Further, interposed between the inner layer 1a and the middle layer 1c is a reinforcing layer 4c, similar to the reinforcing layer 4 of the first embodiment, and interposed between the middle resin layer 1c and the outer layer 1b is a mesh 4d made of natural fibers, being the same as illustrated in FIG. 8.

FOURTH EMBODIMENT

Figure 10:
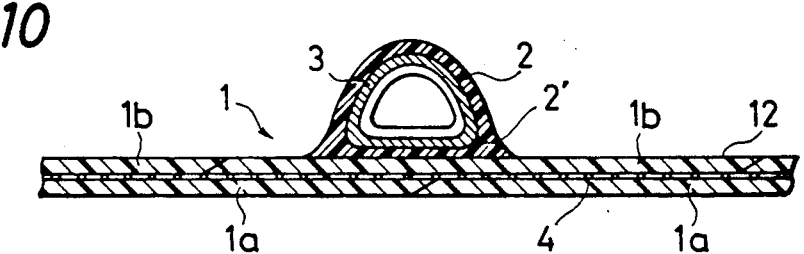
FIG. 10 is a view similar to FIG. 9 but showing a fourth embodiment of a pipe of the invention.
Figure 11:
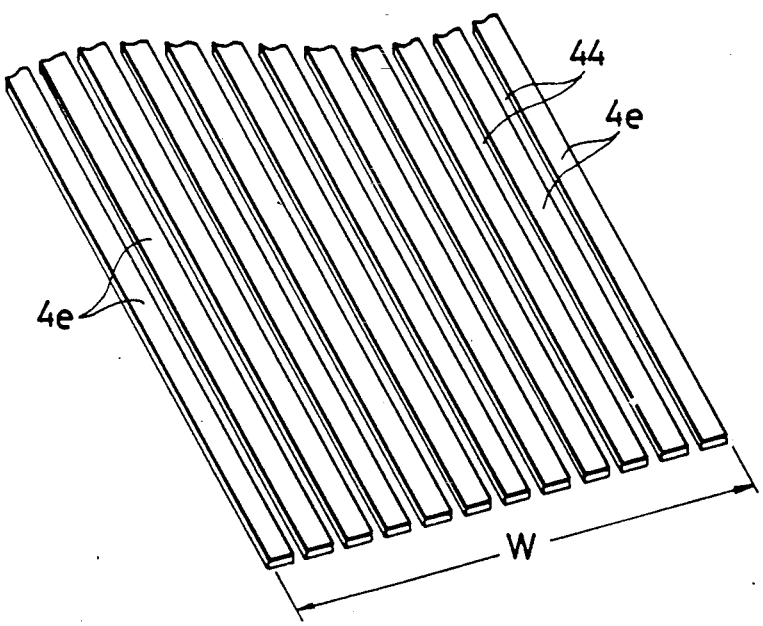
FIG. 11 shows a perspective view of a reinforcing material used in the embodiment of FIG. 10.

In the fourth embodiment, illustrated in FIGS. 10 and 11, an inner layer 1a and an outer 1b sandwich therebetween a reinforcing layer 4 composed of a belt of slender metal strips 4e wound at a predetermined small interval 44 to provide a total width W substantially equal to the belt which forms the outer layer 1b. In this case, the corrugations 2 are formed by winding an element composed of a corrugated reinforcing rib 3 cut with an extruded layer 2 of a synthetic resin material the same as the outer layer 1b, or at least a material having a high fusibility with the material of the outer layer 1b.

In any of the embodiments of the invention, the reinforcing layer can be made of a metal, natural fibers, artificial fibers, or circular or flat wires. For the synthetic resin forming the inner and outer layers of the pipe body 1 and the extruded coating around the corrugated tube 3, a synthetic resin material such as olefin materials including polyethylene and polypropylene may be used. Otherwise, a synthetic resin material such as a vinyl chloride material may be employed. Of course, other materials may be used as well.

Although in the description above, the pipe body 1 is described as being a two- or three-layered structure, the present invention is not restricted to such an arrangement. It is only necessary that the pipe body have a reinforcing layer of the same general type discussed above.

In any of the embodiments discussed above, a reinforced corrugated pipe is provided having a remarkable pressure-withstanding property while being light, flexible and easy to handle. Moreover, the amount of synthetic resin material needed is reduced relative to that required by prior art techniques, thereby reducing the cost of the pipe.

I claim:

1. A pipe for withstanding internal pressure and constant external pressure due to underground use, the pipe comprising:
    a pipe wall formed by at least an inner and an outer layer, both said inner and outer layers being made of a synthetic resin material;
    a first reinforcing layer disposed in said pipe wall, said reinforcing layer comprising a belt made of metal and being helically wound around said inner layer; and
    a reinforcing rib constituted by a hollow corrugated pipe with a cover layer which is made of a synthetic resin material having a high fusibility with said synthetic resin material of said inner and outer layers and is formed around said corrugated pipe, said reinforcing rib being helically wound around said outer layer at a predetermined pitch, said rib having a substantially semicircular cross-section with a substantially flat lower surface disposed in contact with said outer layer, and having its cover layer integrally fused with said outer layer.

2. A pipe for withstanding internal pressure and constant external pressure due to underground use, the pipe comprising:
    at least an inner (1a) and an outer layer (1b), both said inner and outer layers being made of a synthetic resin material;
    a first reinforcing layer (4) interposed between said inner and outer layers, said reinforcing layer comprising a belt made of metal having a plurality of holes punched therein and helically wound around said inner layer; and
    a reinforcing rib (3) constituted by a hollow corrugated pipe with a cover layer (2) which is made of a synthetic resin material having a high fusibility with said synthetic resin material of said inner and outer layers and is formed around said corrugated pipe, said reinforcing rib being helically wound around said outer layer at a predetermined pitch, said rib having a substantially semicircular cross-section with a substantially flat lower surface disposed in contact with said outer layer, and having its cover layer integrally fused with said outer layer.

3. The pipe of claim 2, further comprising an intermediate layer of a synthetic resin material interposed between said first reinforcing layer and said outer layer, and a second reinforcing layer formed between said intermediate layer and said outer layer.

4. The pipe of claim 3, wherein said first and second reinforcing layers are different in material from each other.

5. The pipe of claim 2, wherein said synthetic resin material of each of said cover layer of said reinforcing rib and said inner and outer layers is selected from the group consisting of olefin and vinyl chloride resins.

6. The pipe claimed in claim 2, wherein said reinforcing rib is first manufactured as a belt-like material before said reinforcing rib is helically wound around said outer layer.

7. The pipe of claim 2, wherein said synthetic resin material of said outer layer is first formed in a belt shape having a predetermined width, then the belt-shaped synthetic resin material is wound around said first reinforcing layer, and wherein said helically wound belt of said first reinforcing layer has a width of substantially one-fourth the predetermined width.

8. The pipe claimed in claim 2, wherein said inner layer is formed by a first helically wound belt member and said outer layer is formed by a second helically wound belt member, junctions between adjacent windings of said inner layer being offset from junctions between adjacent windings of said outer layer, and said inner and outer layers being fused to one another through said holes in said first reinforcing layer.

9. A pipe for withstanding internal pressure and constant external pressure due to underground use, the pipe comprising:
- at least an inner (1a) and an outer layer (1b), both said inner and outer layers being made of a synthetic resin material;
- a first reinforcing layer (4) interposed between said inner and outer layers, said reinforcing layer comprising a mesh; and
- a reinforcing rib (3) constituted by a hollow corrugated pipe with a cover layer (2) which is made of a synthetic resin material having a high fusibility with said synthetic resin material of said inner and outer layers and is formed around said corrugated pipe, said reinforcing rib being helically wound around said outer layer at a predetermined pitch, said rib having a substantially semicircular cross-section with a substantially flat lower surface disposed in contact with said outer layer, and having its cover layer integrally fused with said outer layer.

10. The pipe of claim 9, further comprising an intermediate layer of a synthetic resin material interposed between said first reinforcing layer and said outer layer, and a second reinforcing layer formed between said intermediate layer and said outer layer.

11. The pipe of claim 9, wherein said synthetic resin material of each of said cover layer of said reinforcing rib and said inner and outer layers is selected from the group consisting of olefin and vinyl chloride resins.

12. The pipe of claim 9, wherein said mesh first reinforcing layer is formed of metal.

13. The pipe claimed in claim 9, wherein said reinforcing rib is first manufactured as a belt-like material before said reinforcing rib is helically wound around said outer layer.

14. The pipe claimed in claim 9, wherein said inner layer is formed by a first helically wound belt member and said outer layer is formed by a second helically wound belt member, junctions between adjacent windings of said inner layer being offset from junctions between adjacent windings of said outer layer, and said inner and outer layers being fused together through said mesh reinforcing layer.

15. A pipe for withstanding internal pressure and constant external pressure due to underground use, the pipe comprising:
- at least an inner (1a) and an outer layer (1b), both said inner and outer layers being made of a synthetic resin material;
- a first reinforcing layer (4) interposed between said inner and outer layers, said reinforcing layer comprising slender metal members spaced at predetermined distances from each other and helically wound around said inner layer; and
- a reinforcing rib (3) constituted by a hollow corrugated pipe with a cover layer (2) which is made of a synthetic resin material having a high fusibility with said synthetic resin material of said inner and outer layers and is formed around said corrugated pipe, said reinforcing rib being helically wound around said outer layer at a predetermined pitch, said rib having a substantially semicircular cross-section with a substantially flat lower surface disposed in contact with said outer layer, and having its cover layer integrally fused with said outer layer.

16. The pipe of claim 15, further comprising an intermediate layer of a synthetic resin material interposed between said first reinforcing layer and said outer layer, and a second reinforcing layer formed between said intermediate layer and said outer layer.

17. The pipe of claim 15, wherein said synthetic resin material of each of said cover layer of said reinforcing rib and said inner and outer layers is selected from the group consisting of olefin and vinyl chloride resins.

18. The pipe claimed in claim 15, wherein said reinforcing rib is first manufactured as a belt-like material before said reinforcing rib is helically wound around said outer layer.

19. The pipe claimed in claim 15, wherein said inner layer is formed by a first helically wound belt member and said outer layer is formed by a second helically wound belt member, junctions between adjacent windings of said inner layer being offset from junctions between adjacent windings of said outer layer, and said inner and outer layers being fused together between adjacent ones of said slender metal members.

* * * * *